July 24, 1951  A. R. CURRY  2,561,846

WINDOW

Filed Dec. 2, 1946  4 Sheets-Sheet 1

Inventor
Avery R. Curry

By *Clarence A. O'Brien and Harvey B. Jacobson*
Attorneys

July 24, 1951

A. R. CURRY 2,561,846

WINDOW

Filed Dec. 2, 1946

Inventor
Avery R. Curry

By Clarence A. O'Brien
and Harvey B. Jacobson
Attorneys

July 24, 1951      A. R. CURRY      2,561,846

WINDOW

Filed Dec. 2, 1946      4 Sheets-Sheet 3

Inventor

Avery R. Curry

By *Clarence A. O'Brien and Harvey B. Jacobson*

Attorneys

July 24, 1951     A. R. CURRY     2,561,846
WINDOW
Filed Dec. 2, 1946     4 Sheets-Sheet 4
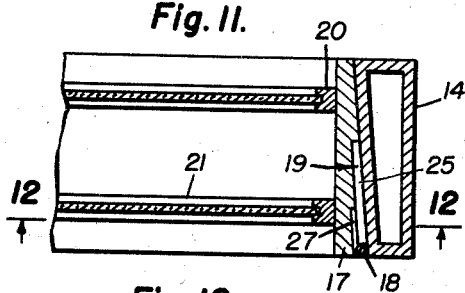
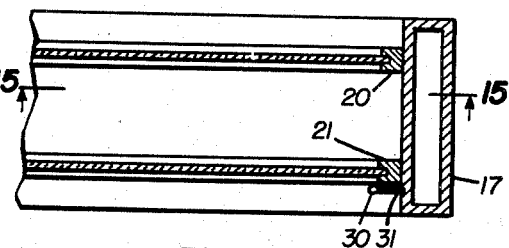
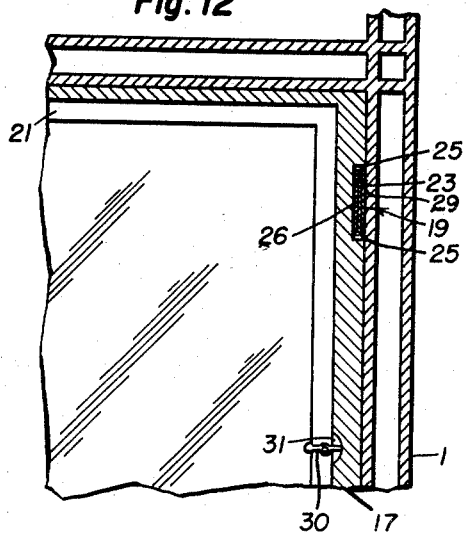
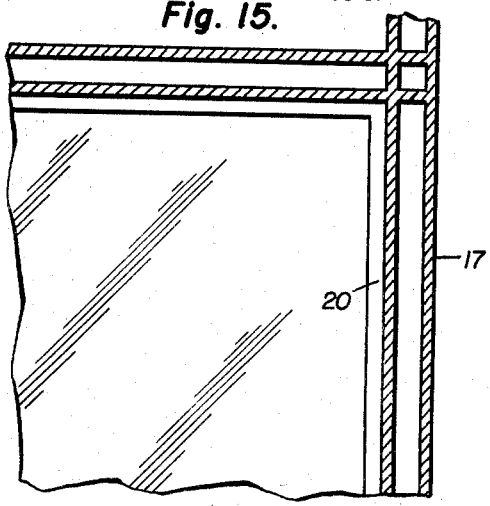
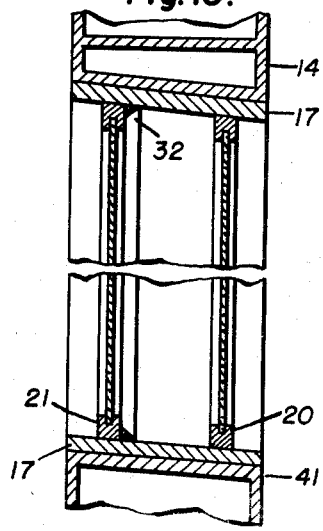
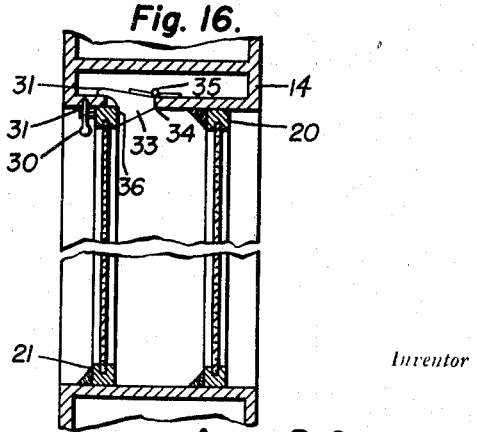
Inventor
Avery R. Curry Patented July 24, 1951

2,561,846

UNITED STATES PATENT OFFICE 2,561,846

WINDOW

Avery R. Curry, Louisville, Ky.

Application December 2, 1946, Serial No. 713,550

6 Claims. (Cl. 160—91)

This invention relates to a modern and novel window construction designed to combine the functions and purposes of the present standard type of mullion window, Venetian blinds or window shades, storm sash and the insert screens in a window frame, and serves all the functions and purposes with less necessary operation action, in addition to giving better ventilation, privacy, insulation and insect protection.

The object of the invention is to provide a window by which upper and lower extensions are provided thereon through the wall of a building provided with means for allowing the entrance of ventilating air at the bottom and exit of air at the top whereby circulation through a room is provided, in addition to allowing heat radiation from the sun's rays when desired, or exclusion of radiated heat from the sun through the windows or panes of glass thereof, while permitting vision to the outside to the exclusion of a view of the inside from the outside and insulation from the heat or cold from the outside, while excluding dust and insects, as well as facilitating opening and closing of the ventilating means from the inside and of the sash, to facilitate washing and cleaning thereof.

Another object of the invention is to provide inner and outer window sash and novel mounting means for the main sash to permit opening thereof toward the inside, as well as access to an insulation curtain or Venetian blinds placed between the sash and inner and outer shutters, which while permitting the entrance of air for ventilation, will exclude rain water, so as to give ample protection against weather while excluding the heat and light rays of the sun.

Another object of the invention is to provide means for regulating the amount of light and heat rays of the sun passing through the window, as well as the degree of vision therethrough, or to eliminate vision into a room from the outside.

Another object is to provide Venetian blinds or an insulating curtain and insect screen between the window sash, which are protected from the weather so as to obviate the necessity of removing the same and insure longer useful life thereof, while permitting access thereto for cleaning.

Another object of the invention is to eliminate the ordinary mullion type of window with sliding upper and lower sash and stops or parting strips therebetween, while allowing complete circulation of air and ventilation of a room with the fresh air entering at the bottom and the heated or foul air passing out at the top, thus improving health giving conditions in a room or building.

Other objects and advantages reside in the details of construction and operation as more fully hereinafter described and claimed, reference being had to the accompanying drawings forming part hereof, wherein like numerals refer to like parts throughout, and in which:

Figure 11 is an enlarged fragmentary sectional view showing the manner of mounting the sash frame in Figures 8 and 9 of the drawings.

Figure 12 is a vertical sectional view taken on the line 12—12 of Figure 11.

Figure 13 is a transverse vertical sectional view of the structure shown in Figures 11 and 12 slightly modified.

Figure 14 is a view similar to Figure 11 showing the fastening means for the inner sash.

Figure 15 is a sectional view taken on the line 15—15 of Figure 14.

Figure 16 is a vertical sectional view showing a modified construction for retaining the inner sash in position and permitting removal of the inner and outer sash, and Figure 17 is an enlarged elevation of one of the sliding hinged mountings for the inner sash as shown in Figures 8, 9, 11 and 12 of the drawings.

Figure 1:
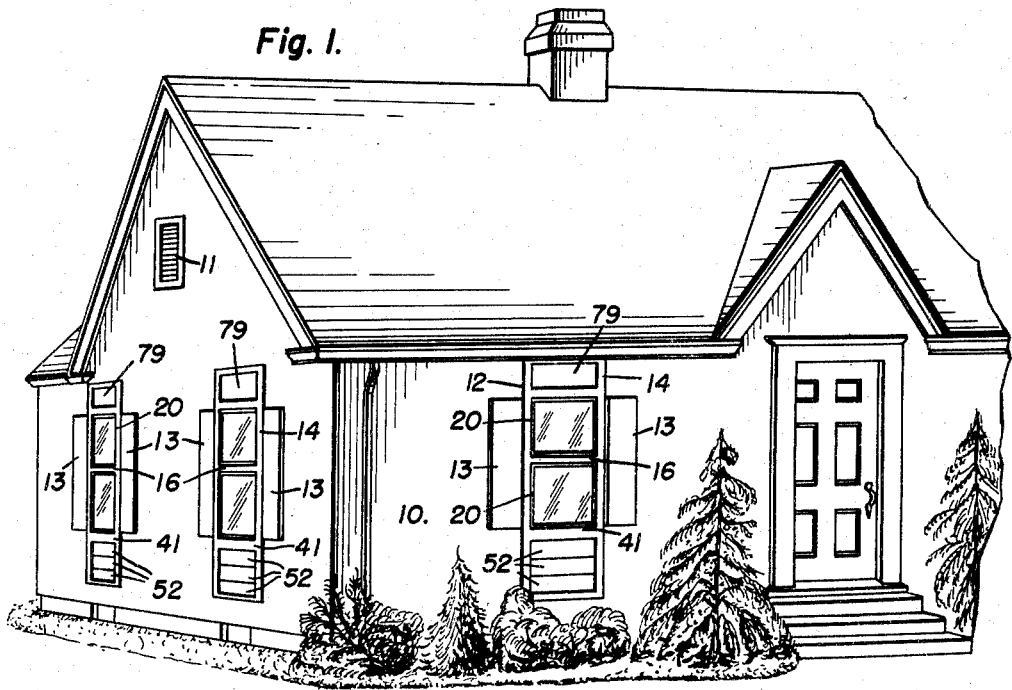
Figure 1 is a perspective view of a portion of a house equipped with the improved windows.
Figure 8:
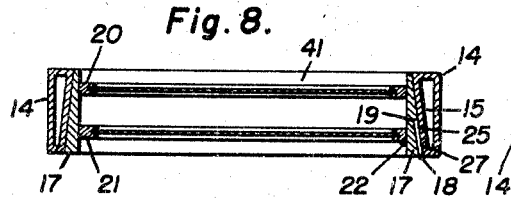
Figure 8 is a horizontal sectional view showing the mounting of the sash.
Figure 9:
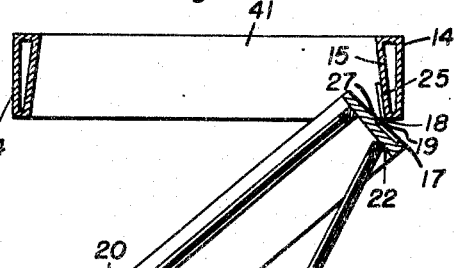
Figure 9 is a view similar to Figure 8 but showing the sash in open positions.

Referring to the drawings in detail, in which like reference characters designate corresponding parts throughout the several views, 10 designates a building in the form of a home or cottage having the usual side walls which may be provided with a vent 11 in the attic. The window openings are designated at 12 and shutters 13 may be provided at the sides of the window openings although this is optional. The present invention includes a window frame 14, which may be of suitable material, such as metal, wood or combinations thereof, while other materials may be employed in the construction of the different parts, including plastic, insulation materials or other materials that prove suitable for the purpose. The frame 14 is shown as rectangular and bevelled or extending at an angle on the inside, as indicated at 15, and may constitute a single frame with an intermediate transverse strip giving the appearance of upper and lower windows or provided with a transverse division strip 16 with upper and lower sash. The frame 14 by reason of the bevelled or angularly extending inner portions 15 is thus enlarged toward the inside, to receive an oppositely tapered main sash 17 which is hinged to the window frame 14, as indicated at 18 with a sliding connection 19 to permit the main sash 17 to be displaced inwardly for permitting access to the outer sash and window pane 20 suitably mounted in the sash 17, and an inner or sub-sash 21 which is hinged to the sash 17 at one side or otherwise suitably mounted, as at 22, to open inwardly in the manner shown in Figure 9 of the drawings, so that access may be had to the outer surface thereof in addition to the inner surface of the outer sash and window pane, for the purpose of washing and cleaning the same. The sliding connection 19 is more particularly shown in Figures 11, 12 and 17 of the drawings, and consists of a channel guide plate 23 having holes 24 by which it may be fastened by screws to the inner surface of the frame 14 at spaced points and near the top and bottom thereof. This guide plate 23 has its top and bottom edges bent to form channels or grooves 25, by bending the same at right angles to the plate and then inwardly in opposite directions toward each other to slidably receive a leaf 26 of the hinge 18, which is made longer than the leaf 27 which is attached to the edge of the main sash 17 as shown in Figure 8. The leaf 26 is elongated and its free end turned as indicated at 28, to provide a shoulder to engage opposed indentations 29 offset or bent inwardly from the flanges of the bent portions 25, to limit the sliding movement of the hinge leaves 26 in the guides or grooves formed thereby and thus the displacement of the inner frame inwardly of the window frame 14, as shown in Figure 9 of the drawings, when the window is opened by swinging the sash inwardly for the purposes above stated. In addition, the inner sash may be held by fasteners or buttons 30 mounted on the inner sash frame to engage in notches 31 in the frame 17 in the manner clearly shown in Figures 2 and 12 of the drawings, at the top and sides thereof. Also, a stop strip 32 may be provided for the inner sash frame as shown in Figure 13 of the drawings at the inclined top and bottom portions of the frame 14 cooperating with corresponding portions of the main sash 17. In Figure 14 of the drawings, the main sash 17 may be rectangular and without the bevel, in which the inner sash frame 21 may be held in position by the buttons of fasteners 30, without the hinge mounting. However, when the hinge mounting is employed permitting inward sliding movement of the main sash 17, the latter is recessed to take the sliding connections 19 including the guide plates 23 and the hinge leaves 26 which enter the same and are limited in their sliding movements therein. Of course, when the main sash 17 is in position as shown in Figures 8 and 11 of the drawings, the hinge leaves 26 are forced or slid outwardly in the guide plates 23.

An alternate construction is shown in Figure 16 of the drawings, in which tapered stops or shutters 33 are hinged in openings 34 in the inner frame or stile 16 as indicated at 35, and provided with recessed inner ends 36 designed to drop down in front of the inner sash frames 21 to limit the displacement of the latter within the main sash 17 or the outer frame 14, if the main sash 17 is omitted. The recesses 36 form projections 37 which overlie the adjacent top portions of the frame to limit the inward movement thereof on the pivots or hinges 35 and the stops or shutters 33 may be moved upwardly, in order to permit the outer sash 20 to be removed. When the sash are in position, the inner sash is held by the buttons 30 engaging the notches 31 as prveiously described.

Figure 10:
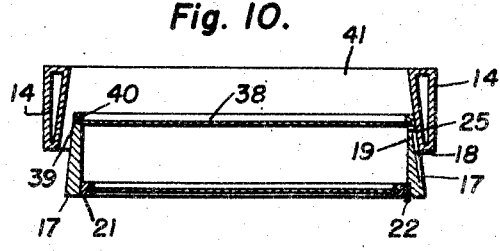
Figure 10 is a view similar to Figure 8 of a modified window and sash construction.

In Figure 10 of the drawings, the outer sash frame 20 is omitted and the pane of glass indicated at 38 is set in a rabbet 39 in the main sash 17 and held by putty as indicated at 40. The inner sash frame 21 is hinged in the usual manner as previously described and indicated at 22. In this form, the inner sash may be opened to obtain access to the surface of the outer pane 38 in connection with the hinge 18 of the sliding hinge connection 19 permitting the inner frame 17 to be swung inwardly as shown, in the same manner, in Figure 9 of the drawings. Below the sill 41 of each window frame 14, a ventilating structure is provided permitting the entrance of cool air into the room from the outside, and if desired, Venetian blinds 42 may be provided between the inner and outer sash, as more particularly shown in Figure 4 of the drawings so as to permit the exclusion of heat radiated from the sun on the window panes or glass and to be operated in any suitable manner, to permit regulation of the amount of light or vision therethrough. Obviously, the inner sash may be opened to permit operation of these blinds which may be of the usual or any desired or standard construction. The slats of the blinds may be blackened on one side and silvered on the other, to enable the use of or eliminate the heat from the sun as desired, as a substitute for an insulation or window shade protected between the glass panes of the inner and outer window sash from the weather and from dirt or dust.

As shown in Figures 4 to 7 inclusive, the lower portion of the window frame and ventilating construction permitting the entrance of cool air has the top portion thereof formed with an overhanging or depending portion 43 extending inwardly and may be bevelled or inclined outwardly as indicated at 44 at the sides and bottom, so as to mount an insect screen 45 in the ventilating opening at the inner edge of the inwardly extending top portion 46 and at the bottom and sides of the frame. Also, suitable brackets 47 are provided the same as in connection with shade rollers to support a roller insulation shade 48 removably therein, in the same manner as window shades, to extend downwardly inwardly of the screen 45 for heat and cold insulation as well as a fire protection to close the opening, operated by a cord 49 extending through an opening 50 in the bottom of the frame 14 and an inner opening 51 which provides a space for receiving the cord in the bottom of the frame, although it is to be understood that the shade may be operated in any other suitable manner.

Mounted in the frame below the window sash in front and outwardly of the screen 45 and insulation shade 48, are a plurality of shutters 52 which are pivoted off-center toward the top edges thereof as indicated at 53, and may be made of wood or metal or other suitable material provided with insulation or glass plates or panels 54 at the inside, seated on recesses or shoulders 55 formed at the inner faces thereof with the ends turned at right angles inwardly to take the pivot mountings. The upper ends of the shutters, which are adapted to overlap when closed or to swing outwardly in inclined position so as to prevent the entrance of rain water during a rainstorm, are pivotally connected by links 56 to rods 57 at one side, slidable in guide sleeves 58 secured at the inner faces of the sides of the frame on which mounted, and adapted to be moved up and down by means of inwardly extending operating rods 59 which extend through slots 60 at the inner side 61 of the bottom portion of the frame, which inner sides are in the form of frames detachably secured in position as by means of screws 62. The rods 59 are provided with detachable operating heads or nuts 63, which when removed, will permit removal of the removable frame sides or plates 61 at the bearings 64, in order to obtain access to the operating parts of the shutters 52.

Provided on the inner sides of the screens 45 and insulation shades 48, as distinguished from the outer sides at which the shutters 52 are mounted, additional shutters 65 are provided, the same being pivoted slightly off-center near their upper edges as indicated at 66 and pivotally connected by links 67 to slidable vertical operating rods 68 also mounted in bearing sleeves 69 mounted at the sides of the frame at the ventilating opening and capable of operation by operating rods 70 movable in bearings 71 and slots 72 in the same manner as the operating rods 59 operate in the slots 60 in connection with the shutters 52. The rods 70 have detachable heads or nuts 72' by which the shutters may be opened and closed but are disposed in inclined positions parallel to the shutters 52 when open, with the air passing between the same at the top after entering between the shutters 52 and between the shutters 65 at the bottom so as to pass upwardly into a room for supplying fresh and cooling air thereto for ventilation. The shutters 65 may have insulation or glass inner coverings 73 as described in connection with the shutters 52, so that when all of the shutters are closed, an effective barrier is provided against the entrance of the weather, including cold of the winter season and excessive heat of summer, when ventilating cool air is excluded. By preference, double walls are provided at the sides of the frame below and above the sash, as indicated at 74 and 75 in Figure 5 of the drawings, to accommodate the connections between the operating rods 57 and 68 and 59 and 70 and through which the link connections extend, as indicated at 76 in Figure 5 of the drawings.

Figures 2, 3, 4:
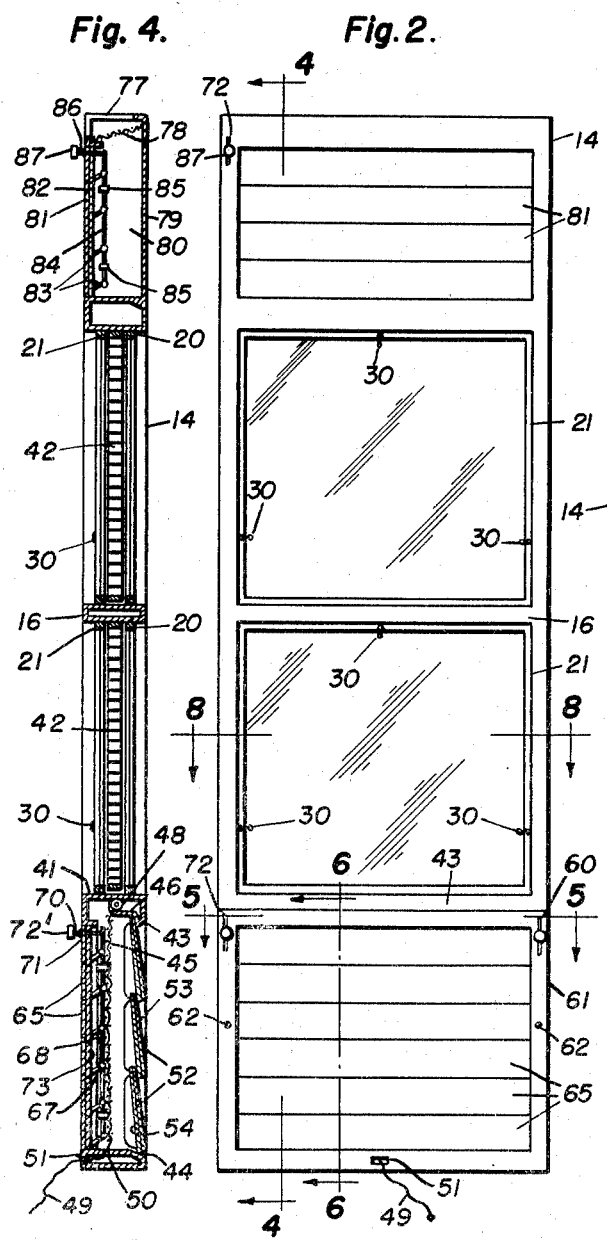
Figure 2 is an enlarged inside elevation of a window in accordance with the invention.
Figure 3 is an elevation of the window looking at the outside.
Figure 4 is a vertical sectional view taken on the line 4—4 of Figure 2.
Figure 5:
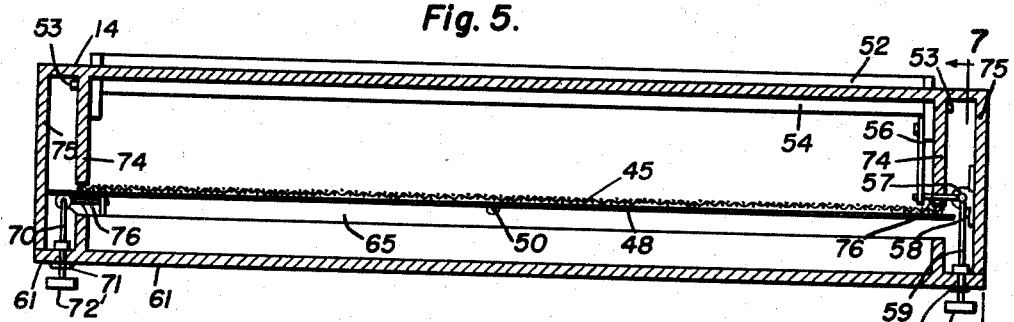
Figure 5 is an enlarged horizontal sectional view taken on the line 5—5 of Figure 2.
Figure 6:
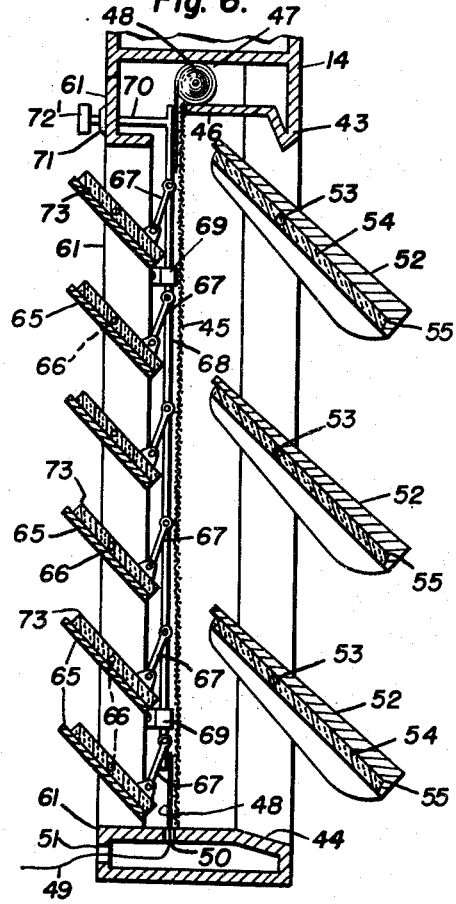
Figure 6 is an enlarged vertical sectional view taken on the line 6—6 of Figure 2.
Figure 7:
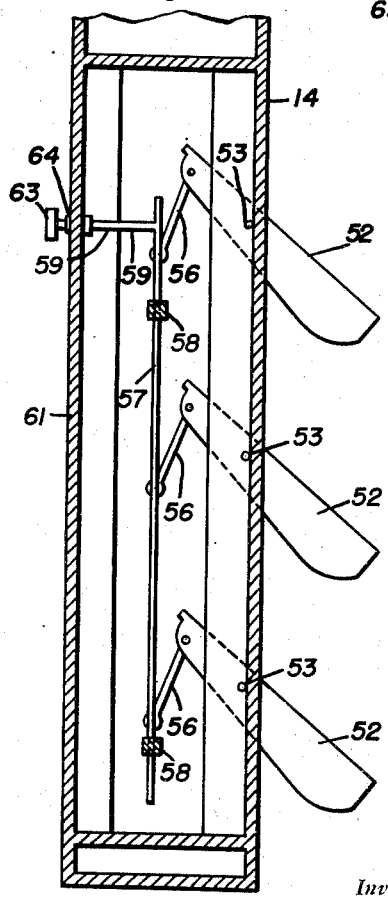
Figure 7 is a sectional view taken on the line 7—7 of Figure 5.

In order to discharge the hot air at the top of the room, the top portion may be provided with suitable ventilating means to allow the hot air to enter the attic of the house or building, and the same is provided with an opening 77 at the top, closed over by an insect screen 78 as more particularly shown in Figure 4 of the drawings. Any suitable ventilator may be provided to lead from the interior of the room so that the circulation of the cool and the exit of the hot air may be allowed at the top. For this purpose, the inner portion of the frame is closed as indicated at 79, providing a chamber 80 for the outlet of the hot air and the inner side is provided with any suitable openable ventilator which when open constitutes an outlet for the hot air, and which when closed, serves to seal the room at the inside. As shown, a plurality of pivoted shutters 81 are provided similar to the shutters 65, having insulating coverings 82 of glass, Celotex, or other suitable material. These shutters are connected by links 83 with an operating rod 84 slidable in bearings 85 and having outwardly extending operating rod portions 86 with their removable knobs, heads or nuts 87 operating in slots, to permit the shutters to be opened and closed. Obviously, a single shutter or plate may be substituted for the shutters 81 constituting an openable ventilating plate or louver adapted to be secured in closed position by a button and release, so as to drop to an open position for allowing the outlet of hot air from a room when being ventilated by the admission of cold air at the bottom and circulation through the room. It may also be pointed out that while the shutters 52 are operated at one side of the frame, the operating means for the shutters 65 are preferably disposed at the opposite side of the frame between the walls 74 and 75 so as to readily accommodate the operating parts thereof.

It will thus be seen that I have provided a very efficient and novel modern window for buildings, especially homes, houses or cottages, which will effectively provide the necessary attractive architectural appearance whether the same is provided with upper and lower sash or divided by a strip or stile to give the appearance of upper and lower sash, even though there are only single sash frames and windows the full length of the frame between the upper and lower ventilating shutters. It will also be seen that by operating the Venetian blinds or a shade between the sash, that the heat from the sun's rays may be excluded from a building, thereby insuring a much cooler interior during the hot months or summertime. The bottom ventilating means or shutters will be open to permit the entrance of cool air, which will make its exit in the form of hot or foul air at the top, to enter the attic for complete ventilation of the building especially in connection with the vent opening 11 with which the attic is provided above the top ceiling. However, even though the shutters may be open, the outer shutters 52 at the bottom, will prevent the entrance of rain even in a rain storm while permitting the entrance of necessary cool air. Also, the screen and shade 48, if closed, will be protected, so as to insure a longer useful life therefor. However, the shade 48 is opened and the entrance of insects prevented by the screen 45 when the shutters 52 and 65 are opened to allow the entrance of cool ventilating air to a room protected by the overhanging top portion 43 of the opening at the frame 14. However, when the shutters are closed in the cold months or wintertime, the insulation shade will be closed and in connection with the insulation coverings for the shutters, will form an effective barrier against the entrance of cold air in the wintertime. This is also true with respect to the shutters 81, these shutters being open only in the hot months or summertime, when the lower shutters are open for the entrance of cool air, so that the hot air will be discharged at the top of the room near the ceiling. Thus, the ventilating window combines all the functions and purposes of the present standard type of mullion window, Venetian blinds or window shades, storm sash and insect screens without the necessity of replacing and operating the same as customary, in a single unique and simple construction capable of economical manufacture and installation in the same manner as an ordinary window frame.

While in the foregoing there has been shown and described the preferred embodiment of this invention it is to be understood that minor changes in the details of construction, combination and arrangement of parts may be resorted to without departing from the spirit and scope of the invention as claimed.

I claim:

1. A ventilating window comprising an outer frame having a central sash receiving portion, said frame being bevelled at the inner sides thereof, a main sash bevelled to fit the inner sides of the outer frame, a sliding hinge connection between the main sash and the outer frame and including guide-ways mounted at the inner surfaces at one side of the outer frame, hinges having leaves slidable in said guide-ways to permit displacement of the main sash inwardly of the outer frame and swinging of the main sash at one side to an open position inwardly, spaced inner and outer sashes mounted in the main sash, said inner sash being hinged at one side and swingable inwardly.

2. A ventilating window including a frame having inner and outer sash in the central portions of said frame spaced apart, a light excluding member including a plurality of vertically movable horizontal slots set between said sash, the lower portion of the frame providing an opening through the wall of a building beneath the window frame and sash, outer shutters swingable outwardly in downwardly inclined positions from within the frame, inner shutters swingable to upwardly inclined positions to permit the entrance of relatively cool air into a room of the building from between the outer shutters, said inner and outer shutters being operable from the inside, and shutters in the top portion of the frame having a top opening for discharging the relatively hot air at the top thereof and operable from the inside, a screen set between the shutters and a screen set in the top of the frame above the upper shutters.

3. A ventilating window comprising a frame having a divided intermediate portion forming a sash receiving frame, spaced inner and outer sash set in said frame, the inner sash being individually openable inwardly of said frame, said frame being provided with openings above and below the sash, inner and outer openable pivoted shutters set in a frame below the sash, and openable shutters set in the frame above the sash, the top of the frame having a discharge opening therethrough, an insulation curtain mounted at the top of the bottom opening below the sash and adapted to be drawn downwardly, said curtan having an operating means at the bottom extending through the bottom of the frame to the inside thereof and a screen set at the top of the frame above the upper shutters and designed to discharge relatively hot air into the attic of a building above the frame.

4. In a structure including a frame having a central opening and slots, sash set in said opening, and comprising an inner and outer sash spaced apart for receiving a Venetian blind therebetween, said inner sash being swingable inwardly to open positions, the frame below the sash having an opening, outer shutters pivoted in the frame at said lower opening and the frame having an overhanging top portion thereabove, said shutters being swingable downwardly to closed position and upwardly to open position to permit the entrance of relatively cool air therebetween into an enclosure, said shutters having an operating rod, links connecting said shutters to said rod, said rod having an inwardly extending portion operating vertically in the slots in the frame for operating said shutters from the inside of the frame and building, inner shutters also pivoted at the sides of the frame and swingable upwardly to closed positions and in upwardly inclined positions when open, an operating rod connecting to said shutters and having an inwardly extending operating portion operating in the slots in said frame, similar shutters mounted in the upper portion of the frame above the sash, the upper portion of the frame being closed on the outside and having a discharge opening for relatively hot air at the top.

5. In a window structure comprising a frame adapted to be set in a window opening of a wall of a building and having an intermediate portion designed to receive sash therein, inner and outer sash set in said intermediate portion and having glass window panes, light excluding members set between said sash and panes, outer shutters pivoted in the lower portion of the frame below the sash, inner shutters set in the lower portion of the frame below the sash and inwardly of the outer shutters, means for simultaneously operating said outer shutters and said inner shutters to open and close the same, openable shutters set in the upper portion of the frame above the sash and means for simultaneously opening and closing the upper shutters.

6. A structure including a frame having a central window opening, a swingable sash supporting frame in said opening and comprising inner and outer sash mounted in spaced apart relation in said swingable frame and provided with adjustable light excluding means therebetween, said inner sash being swingable inwardly to open positions.

AVERY R. CURRY.

REFERENCES CITED

The following references are of record in the file of this patent:

UNITED STATES PATENTS

| Number | Name | Date |
|---|---|---|
| 871,342 | Kabureck | Nov. 19, 1907 |
| 1,192,406 | Fair | July 25, 1916 |
| 1,345,915 | Fair | July 6, 1920 |
| 1,428,882 | Dyer | Sept. 12, 1922 |
| 1,867,454 | Herman | July 12, 1932 |
| 2,074,370 | Coulton | Mar. 23, 1937 |
| 2,170,877 | Simon | Aug. 29, 1939 |
| 2,211,581 | Ross | Aug. 13, 1940 |
| 2,249,641 | Stucki | July 15, 1941 |
| 2,320,268 | Cramer | May 25, 1943 |

FOREIGN PATENTS

| Number | Country | Date |
|---|---|---|
| 183,255 | Great Britain | July 21, 1922 |